United States Patent
Files et al.

(10) Patent No.: US 10,175,922 B2
(45) Date of Patent: Jan. 8, 2019

(54) WIRELESSLY COMMUNICATING DATA BETWEEN TWO HOUSINGS OF A COMPUTING DEVICE

(71) Applicant: Dell Products L. P., Round Rock, TX (US)

(72) Inventors: Jace W. Files, Round Rock, TX (US); John Trevor Morrison, Round Rock, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 15/407,636

(22) Filed: Jan. 17, 2017

(65) Prior Publication Data
US 2018/0203658 A1 Jul. 19, 2018

(51) Int. Cl.
*G06F 3/14* (2006.01)
*G06F 1/16* (2006.01)
*G09G 5/00* (2006.01)

(52) U.S. Cl.
CPC .......... *G06F 3/1431* (2013.01); *G06F 1/1681* (2013.01); *G06F 1/1683* (2013.01); *G09G 5/006* (2013.01); *G09G 2370/16* (2013.01)

(58) Field of Classification Search
CPC .... G06F 1/1681; G06F 1/1683; G06F 3/1446; G06F 3/1431; G09G 2300/026; G09G 5/006; G09G 2370/16
USPC ........................... 345/1.1–3.4; 455/90.3, 128
See application file for complete search history.

(56) References Cited

U.S. PATENT DOCUMENTS

| | | | | |
|---|---|---|---|---|
| 7,808,549 B2* | 10/2010 | Kanai | ................... | G06F 1/1616 348/373 |
| 2007/0127199 A1* | 6/2007 | Arneson | ............... | G06F 1/1618 361/679.56 |
| 2008/0170356 A1* | 7/2008 | Alameh | ............... | G02B 6/3604 361/600 |
| 2008/0311962 A1* | 12/2008 | Demuynck | ........... | G06F 1/1616 455/575.1 |
| 2010/0285672 A1* | 11/2010 | Symons | ................ | G06F 1/1616 439/8 |
| 2011/0304607 A1* | 12/2011 | Ito | ........................... | G06T 11/60 345/419 |
| 2012/0242895 A1* | 9/2012 | Sultenfuss | ............... | H04N 5/46 348/441 |

(Continued)

*Primary Examiner* — Amr A Awad
*Assistant Examiner* — Aaron Midkiff
(74) *Attorney, Agent, or Firm* — Campbell Stephenson LLP; Shiv S. Naimpally

(57) ABSTRACT

A computing device may include a first housing and a second housing attached by a hinge. A first data transceiver in the first housing may transmit signals, including a video signal, to a second data transceiver in the second housing. The second data transceiver may receive the signals and send the video signal to a display device in the second housing. Each data transceiver may include a frame on which is mounted a circuit board having an antenna, a set of magnets, and a pair of bearings on either end of the frame that enable each data transceiver to rotate. An attraction between the magnets of the first data transceiver and the magnets of the second data transceiver may cause one or both data transceivers to rotate, such that the antennas remain facing each other regardless of an orientation of the computing device.

20 Claims, 10 Drawing Sheets

(56) References Cited

U.S. PATENT DOCUMENTS

| | | | | |
|---|---|---|---|---|
| 2013/0242495 A1* | 9/2013 | Bathiche | ............... | G06F 1/1626 361/679.28 |
| 2014/0273853 A1* | 9/2014 | Isaac | .................... | H04B 5/0031 455/41.2 |
| 2015/0345195 A1* | 12/2015 | Park | ........................ | F16C 11/10 16/354 |
| 2016/0091924 A1* | 3/2016 | Aoki | .................. | F16M 11/2007 361/679.09 |
| 2016/0266704 A1* | 9/2016 | Park | ........................ | G06F 3/0416 |
| 2017/0300279 A1* | 10/2017 | McCormack | ............ | G06F 13/00 |
| 2017/0365229 A1* | 12/2017 | Kwa | ....................... | G09G 5/003 |

* cited by examiner

WIRELESSLY COMMUNICATING DATA BETWEEN TWO HOUSINGS OF A COMPUTING DEVICE

BACKGROUND OF THE INVENTION

Field of the Invention

This invention relates generally to dual-display devices and, more particularly, to transmitting data from one side of a dual-display computing device to another side of the dual-display computing device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a tablet computing device that has two display devices, e.g., a dual-display computing device, the various components of the computing device may be located in a first housing that includes a first display device and a second housing that includes a second display device. Multiple wires (e.g., cables) may connect the components to each other. For example, cables for video data, input/output data (e.g., universal serial bus (USB)) and the like may connect the various components of the dual-display computing device. However, running cables between the two sides, e.g., between the two housings, may create concerns because repeatedly flexing the cables could cause one or more of the cables to fray or break. Frayed or broken cables may cause undesirable problems, such as causing the computing device to intermittently or permanently fail, causing internal components to malfunction or fail, or the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A computing device may include a first housing and a second housing attached by a hinge. Data between components of the computing device may be wirelessly transmitted between the two housings. For example, a first data transceiver in the first housing may transmit signals, including a video signal, to a second data transceiver in the second housing. The second data transceiver may receive the signals and send the video signal to a display device in the second housing. Each data transceiver may include a frame on which is mounted (1) a circuit board having an antenna, (2) a set of magnets, and (3) a pair of bearings on either end of the frame that enable each data transceiver to rotate. An attraction between the magnets of the first data transceiver and the magnets of the second data transceiver may cause one or both data transceivers to rotate, such that the antennas remain facing each other regardless of an orientation of the computing device.

BRIEF DESCRIPTION OF THE DRAWINGS

A more complete understanding of the present disclosure may be obtained by reference to the following Detailed Description when taken in conjunction with the accompanying Drawings. In the FIGS., the left-most digit(s) of a reference number identifies the FIG. in which the reference number first appears. The same reference numbers in different FIGS. indicate similar or identical items.

DETAILED DESCRIPTION

Figure 1:
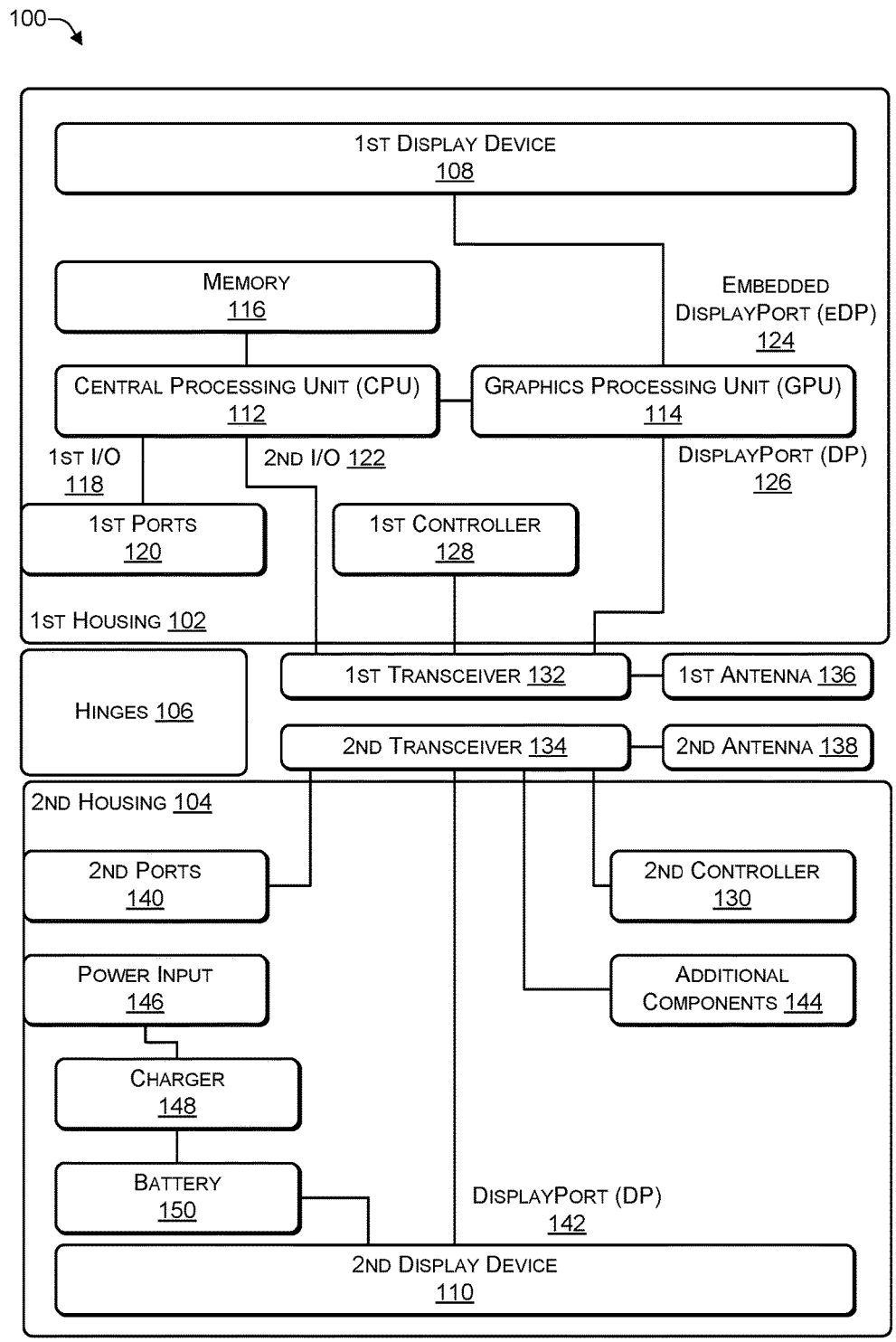
FIG. 1 is a block diagram of an architecture of a computing device that includes two wireless data transceivers according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable wireless transmission of data between two sides of a computing device. For example, a dual-display computing device may include a first housing ("first side") with a first display device, coupled using one or more hinges to a second housing ("second side") with a second display device. The components of the computing device, such as a central processing unit (CPU), a graphics processing unit (GPU), one or more ports (e.g., data ports, audio ports, video ports, and the like), battery, battery charger, microphone(s), speaker(s), and the like may be located in one of the two housings. For example, the first housing may include the CPU, GPU, a first microphone, a first speaker, and a first set of ports and the second housing may include the battery charger, battery, a second microphone, a second speaker, and a second set of ports.

Data may be wirelessly communicated between (e.g., transmitted to and received from) the first housing (e.g., that houses the first display device) and the second housing (e.g., that houses the second display device) using two data transceivers. For example, a first data transceiver may be located at a first edge of the first housing and may wirelessly transmit (or receive) data to (or from) a second data transceiver located at a second edge of the second housing.

The data transceivers may use an extremely high frequency (EHF) to transmit and receive data. For example, the EHF may be between 30 Gigahertz (GHz) and 300 GHz and may be used to transport electrical-based protocols (e.g., data) over a short distance (e.g., 20 millimeters (mm) or less) through specific types of materials (e.g., plastics) and air. For example, in some cases, the data transceivers may operate at approximately 60 GHz and transmit over a distance of less than 10 mm (e.g., approximately 7 mm). By using wireless communications between the two housings, failures resulting from the wear-and-tear of repeatedly flexing data cables that run between the two housings may be avoided. In some cases, a single power cable may run from the second housing to the first housing to distribute power between the two housings. In addition, the use of EHF may reduce (or eliminate) radio frequency interference (RFI) and electro-magnetic interference (EMI) as compared to using cables, because EHF is at a much higher frequency than other frequencies used in the computing device (e.g., 60 Hz alternating current (AC), 480 megabits per second (MBps) for USB 2.0, 5 gigabits per second (GBps) for USB 3.0, and the like). The data transceivers may be relatively small, e.g., approximately the size of a coffee bean. Power consumption to transmit the data wirelessly between the two housings may be relatively low. For example, using the data transceivers to transmit data may consume no more than approximately 5% of the power consumed by the computing device, as compared to using cables to transmit data.

The two transceivers may communicate data bi-directionally, e.g., from the first housing to the second housing and from the second housing to the first housing, simultaneously (e.g., substantially at the same time). For example, one or more multiplexing techniques, such as frequency division multiplexing (FDM), time division multiplexing (TDM), or a combination of both may be used to communicate the data. In FDM, the total bandwidth available is divided into a series of non-overlapping frequency sub-bands, with each frequency sub-band used to carry a separate signal in one direction. FDM thus enables multiple independent signals to be communicated bi-directionally between the two transceivers. In TDM, independent digital signals (analog signals are digitized prior to transmission) are transmitted over a common frequency band such that each signal appears on the line only a fraction of time. For example, two or more USB data signals may share a single EHF frequency band by alternating sending data packets.

Each of the data transceivers may include a frame on which is mounted a circuit board with one or more transceiver chips. Each circuit board may include an antenna to transmit data and to receive data. Both ends of each data transceiver may include a bearing that enables the data transceivers to rotate (e.g., relative to each other and relative to the computing device). Each data transceiver may include a set of one or more magnets. A first set of magnets on a first data transceiver may interact with a second set of magnets on the second data transceiver to keep the data transceivers in a particular position relative to each other. For example, the first set of magnets may be placed in the first data transceiver with a particular polarity and may face the second set of magnets having an opposite polarity in the second data transceiver. The attraction of the two sets of magnets with opposite polarities and the rotational freedom provided by the bearings may cause the first data transceiver to be positioned in a particular position (e.g., with the antennas of the first data transceiver facing the antennas of the second data transceiver) with respect to the second data transceiver, regardless of an orientation (e.g., vertical orientation or horizontal orientation) of the computing device. To illustrate, the magnets and bearings may cause the antennas of the two data transceivers to face each other independent of the orientation of the computing device and independent of the angle between the two display devices. The magnets and bearings may enable the antennas to remain within a line of sight of each other and within a predetermined distance (e.g., 10 mm or less) from each other. In this way, data may be transmitted between one side of the computing device and the other side of the computing device in any orientation that a user places the two housings of the computing device.

Thus, a dual-display computing device may locate the various components of the computing device in two housings that each house a display device. Data may be communicated (e.g., transmitted and received) between the two housings using two data transceivers. A first data transceiver may include a first set of magnets positioned based on polarity to attract a second set of magnets in the second data transceiver. Each data transceiver may have an antenna. Each data transceiver may have a bearing on each end to enable the magnets to cause the data transceivers to rotate. The data transceivers may be self-aligning, e.g., the data transceivers may rotate such that the antennas continually face each other and remain within a particular distance from each other, regardless of an orientation of the computing device. In this way, data cables may not be used to connect the various components of the computing device that are distributed among the first housing and the second housing, thereby avoiding issues caused by repeatedly flexing data cables.

As a first example, a computing device may include a first housing attached to a second housing by one or more hinges. The first housing may include a computer motherboard with a graphics processing unit (GPU) providing two video outputs, such as, for example, an embedded DisplayPort (eDP) output and a DisplayPort (DP) output. A first display device in the first housing may receive a first video signal (e.g., at least two lanes of eDP) from the GPU. The first housing may include a first data transceiver to wirelessly transmit first data to a second data transceiver and to wirelessly receive second data transmitted by the second data transceiver. The first data may include a second video signal. The first data and the second data may include at least one of: a USB (e.g., USB 2.0, USB 3.0, and the like) signal, an inter-integrated circuit (I2C) signal, a system management bus (SMB) compliant signal, an audio signal (e.g., from a microphone or for a speaker), a general-purpose I/O (GPIO) signal, a signal received from a sensor (e.g., global positioning system (GPS) sensor, magnetometer, accelerometer, gyroscope, compass, barometer, or the like), and a wireless signal, such as Wi-Fi, Bluetooth, or cellular (e.g., code division multiple access (CDMA) or global system mobile (GSM)). The second housing may include a second display device and the second data transceiver. The second data transceiver may wirelessly transmit the second data to the first data transceiver and wirelessly receive the first data transmitted by the first data transceiver. The second video signal (e.g., at least two lanes of DP) included in the first data may be sent to the second display device in the second housing. Each of the first data transceiver and the second data transceiver may include a frame on which is mounted at least one magnet, a circuit board that includes at least one transceiver chip, an antenna, and at least one absorber. The frame may include a first cylindrical protrusion over which a first toroidal-shaped bearing is placed and a second cylindrical protrusion over which a second toroidal-shaped bearing is placed. The first and second toroidal-shaped bearings may enable the first data transceiver and the second data transceiver to each rotate independently relative to the computing device. A first set of magnets located in the first data transceiver may face outward with a first polarity. A second set of magnets located in the second data transceiver may face outward with a reverse polarity relative to the first polarity. The first set of magnets may have an attraction to the reverse polarity of the second set of magnets. The first data transceiver may be enclosed in a first enclosure having a first clear window and the second data transceiver may be enclosed in a second enclosure having a second clear window. The clear windows may enable a first antenna associated with the first data transceiver to be in a line of sight and within 10 millimeters (mm) of a second antenna associated with the second data transceiver.

As a second example, a computing device may include a first housing attached to a second housing by one or more hinges. The first housing may include a first display device and the second housing may include a second display device. A first data transceiver may receive one or more signals that include a video signal (e.g., at least two lanes of DP). The first data transceiver may wirelessly transmit the one or more signals, including the video signal, to a second data transceiver located in the second housing. For example, the first data transceiver may wirelessly transmit the one or more signals to the second data transceiver at an extremely high frequency (EHF) (e.g., between about 50 gigahertz (GHz) and about 70 GHz). The one or more signals may include at least one of: a USB (e.g., USB 2.0, USB 3.0, and the like) signal, an inter-integrated circuit (I2C) signal, a system management bus (SMB) compliant signal, an audio signal (e.g., from a microphone or for a speaker), a general-purpose I/O (GPIO) signal, a signal received from a sensor (e.g., global positioning system (GPS) sensor, magnetometer, accelerometer, gyroscope, compass, barometer, or the like), and a wireless signal, such as Wi-Fi, Bluetooth, or cellular (e.g., code division multiple access (CDMA) or global system mobile (GSM)). The first data transceiver may include a first frame to which is attached (1) a first circuit board comprising a first antenna, (2) a first set of magnets facing outward from the first frame with a first polarity, and (3) a first pair of bearings mounted on either end of the first frame that enable the first circuit board to rotate. The second data transceiver may include (1) a second frame, (2) a second circuit board comprising a second antenna, (3) a second set of magnets facing outward from the second frame with a reverse polarity relative to the first polarity causing a magnetic attraction between the first set of magnets and the second set of magnets and (4) a second pair of bearings mounted on either end of the second frame that enable the second circuit board to rotate. As the orientation of the computing device is changed, the magnetic attraction between the first set of magnets and the second set of magnets may cause the first data transceiver to rotate within the first pair of bearings or the second data transceiver to rotate within the second pair of bearings such that the first antenna faces the second antenna regardless of an orientation of the computing device. The second data transceiver may receive an additional signal from a component of the computing device that is located in the second housing and wirelessly transmitting the additional signal from the second data transceiver to the first data transceiver.

As a third example, a computing device may include a first housing coupled to a second housing by one or more hinges. The first housing may include comprising a first data transceiver to wirelessly communicate data. The first data transceiver may include a first frame to which is attached a first circuit board that includes a first antenna, a first set of magnets facing outward from the first frame with a first polarity, and a first pair of bearings mounted on either end of the first frame that enable the first circuit board to rotate relative to the first housing. The second housing may include a second data transceiver to wirelessly communicate the data to and from the first data transceiver at a frequency of between about 50 gigahertz (GHz) and about 70 GHz. The second data transceiver may include a second frame to which is attached a second circuit board with a second antenna, a second set of magnets facing outward from the second frame with a reverse polarity relative to the first polarity (e.g., causing a magnetic attraction between the first set of magnets and the second set of magnets), and a second pair of bearings mounted on either end of the second frame that enable the second circuit board to rotate relative to the second housing. In some cases, the first data transceiver may be enclosed in a first enclosure having a first clear window and the second data transceiver may be enclosed in a second enclosure having a second clear window. The clear windows may enable the first antenna of the first data transceiver to remain approximately parallel (e.g., within in a line of sight of) and within a particular distance (e.g., 7 mm or less) from the second antenna of the second data transceiver. The data received by the second data transceiver from the first data transceiver may include two (or more) lanes of a DisplayPort (DP) signal. The first housing may also include (1) a computer motherboard that includes a graphics processing unit (GPU) and (2) a first display device connected to an embedded DisplayPort (eDP) output of the GPU. The second housing may also include a second display device to receive the two (or more) lanes of the DP signal. The data may also include at least one of a universal serial bus (USB)

2.0 compliant signal, a USB 3.0 compliant signal, an inter-integrated circuit (I2C) compliant signal, a system management bus (SMB) compliant signal, an audio signal, a general-purpose I/O (GPIO) compliant signal, a sensor signal received from a sensor, or a wireless signal from an antenna, such as a WiFi signal, a Bluetooth signal, or a cellular signal. The attraction between the first set of magnets and the second set of magnets may cause at least one of the first data transceiver to rotate within the first pair of bearings or the second data transceiver to rotate within the second pair of bearings, such that the first antenna remains facing (e.g., is in a line of sight of) the second antenna regardless of an orientation of the computing device.

FIG. 1 is a block diagram of an architecture of a computing device 100 that includes two wireless data transceivers according to some embodiments. The computing device 100 may include a first housing 102 coupled to a second housing 104 via one or more hinges 106. The hinges 106 may enable the two housings 102, 104 to be positioned at different angles relative to each other in different orientations (e.g., vertical orientations and horizontal orientations). A first display device 108 may be located in the first housing 102 and a second display device 110 may be located in the second housing 104.

A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 114. The GPU 114 may be integrated into the CPU 112 or may be a separate device from the GPU 114. The CPU 112 and GPU 114 may be connected to a first input/output (I/O) bus 118 that provides a first set of one or more I/O ports 120 in the first housing 102 and a second I/O bus 122 that is wirelessly connected to the second housing to provide a second set of one or more ports 140. For example, the ports 120, 140 may include video ports, such as a video graphics adapter (VGA) port, a digital video interface (DVI) port, a high definition media interface (HDMI) port, a ThunderBolt® port, audio ports (e.g., microphone jack, headphone, jack, and the like), another type of signal port, or any combination thereof. The ports 120, 140 may include one or more universal serial bus (USB) ports compliant with USB 2.0, USB 3.0, and the like. The ports 120, 140 may include an Ethernet port, audio I/O ports, and the like. The GPU 114 may include two or more lanes of an embedded DisplayPort (eDP) output 124 connected to the first display device 108 in the first housing and two or more lanes of a DisplayPort (DP) output 126 that is wirelessly connected to the second display device 110 in the second housing 104.

A first controller 128 (e.g., embedded controller) may control a first wireless data transceiver 132 in the first housing 102. A second controller 130 (e.g., embedded controller) may control a second wireless data transceiver 134 in the second housing 104. The first transceiver 132 may use a first antenna 136 to transmit data to (and receive data from) the second transceiver 134 and the second transceiver 134 may use a second antenna 138 to transmit data to (and receive data from) the first transceiver 132.

The wireless data transceivers 132, 134 may simultaneously (e.g., substantially at the same time) communicate data bi-directionally, e.g., from the first housing to the second housing and from the second housing to the first housing, simultaneously (e.g., substantially at the same time). For example, one or more multiplexing techniques, such as frequency division multiplexing (FDM), time division multiplexing (TDM), or a combination of both may be used to communicate the data. In FDM, the total bandwidth available is divided into a series of non-overlapping frequency sub-bands, with each frequency sub-band used to carry a separate signal in one direction. FDM thus enables multiple independent signals to be communicated bi-directionally between the two transceivers. In TDM, independent digital signals (e.g., analog signals may be digitized prior to transmission) are transmitted over a common frequency band such that each signal appears on the line only a fraction of the time. The two or more signals thus share the same frequency band by sharing the time the frequency band is used. For example, two or more USB data signals may share a single EHF frequency band by alternating sending data packets. An example of simultaneous bi-directional transmission may include sending the DP output 126 from the first transceiver 132 to the second transceiver 134 while simultaneously sending, from the second transceiver 134 to the first transceiver 132, (1) data from a device connected to one of the second set of ports 140 and/or (2) data from one or more of the additional components 144 (e.g., keyboard, trackpad, and the like). Thus, in the dual-display computing device 100, the DP output 126 may be sent from the first transceiver 132 to the second transceiver 134. Simultaneously, multiple additional signals may be bi-directionally communicated between the transceivers 132, 134 by multiplexing at least some of the signals.

The second housing 104 may include a remaining portion of the components of the computing device 100. For example, the remaining portion of the components may be located in the second housing 104 (e.g., behind the second display device 110). The second transceiver 134 may, based on communications with the first transceiver 132, provide a DP output 142 (corresponding to the DP output 126 of the GPU 114) and a second set of I/O ports 140. The second housing 104 may include additional components 144 (e.g., keyboard, touchpad, trackball, speaker, microphone, Wi-Fi antenna, Bluetooth antenna, cellular antenna, and the like), a power input 146 (e.g., alternating current (AC) or direct current (DC) input), a charger 148, and a battery 150. The battery charger 148 may also be used as a power source to provide power instead of (or in addition to) the battery 250 when the battery 150 is depleted or inoperable. A first power distribution bus in the first housing 102 may receive power from the battery 150 (or the charger 148) and distribute the power to the components in the first housing 102. A second power distribution bus in the second housing 104 may distribute power from the battery 150 (or the charger 148) to the components in the second housing 104. A cable threaded through one or more of the hinges 106 may be used to connect the first power distribution bus in the first housing 102 to the second power distribution bus in the second housing 104 and to the battery 150 and the charger 148.

In FIG. 1, the first set of components of the computing device 100 shown as being housed in the first housing 102 and the remaining set of components shown in the second housing 104 are purely for illustration purposes. Depending on the implementation, different components may be housed in each of the housings 102, 104 while using the transceivers 132, 134 to provide wireless communications between the components in the first housing 102 and the components in the second housing 104. For example, when the computing device 100 is designed for graphics processing, the GPU 114 and supporting hardware (e.g., graphics support chips, graphics memory, and the like) may be housed in the second housing 104. As another example, in some cases, the ports 120, 140 may all be located in the first housing 102 or in the second housing 104 rather than being split between the two housings 102, 104. As a further example, the battery 150 may include multiple cells, with a portion of the cells located in the first housing 102 and a remaining portion of the cells located in the second housing 104. In some cases, which components of the computing device 100 are located in each of the housings 102, 104 may be determined on the thermal characteristics of the components. For example, the components may be distributed between the housings 102, 104 to enable each of the housings 102, 104 to heat up to approximately the same temperature. Doing so may avoid the situation where components that generate the most heat are grouped into the same housing, thereby causing one housing to be hotter than the other housing.

The first transceiver 132 may receive data (e.g., via one or more data buses in the first housing 102) from a portion of the components (e.g., the components 112, 114, 116, 120) housed in the first housing 102 and wirelessly transmit the data from a first antenna 136 to a second antenna 138 associated with the second transceiver 134. The second transceiver 134 may receive the data from the first transceiver 132 (e.g., via the antennas 136, 138) and distribute the data (e.g., via one or more data buses in the second housing 104) to the remaining portion of the components (e.g., the components 140, 144) housed in the second housing 104.

The second transceiver 134 may receive data (e.g., via one or more data buses in the second housing 104) from the portion of the components (e.g., the components 140, 144) housed in the second housing 104 and wirelessly transmit the data from the second antennas 138 to the first antenna 136 associated with the first transceiver 132. The first transceiver 132 may receive the data from the second transceiver 134 (e.g., via the antennas 136, 138) and distribute the data (e.g., via one or more data buses in the first housing 102) to the portion of the components (e.g., the components 112, 114, 116, 120) housed in the first housing 102.

Thus, a first portion of components (e.g., 112, 114, 116, and 120) may be located in the first housing 102 (e.g., behind the first display device 108) of the dual-display computing device 100. A remaining portion of the components (e.g., 140, 144, 148, 150) may be located in the second housing 104 (e.g., behind the second display device 110) of the dual-display computing device 100. Data may be wirelessly communicated between the components in the first housing 102 and the components in the second housing 104 using self-aligning wireless transceivers 132, 134. For example, data may be wirelessly communicated between the first data transceiver 132 associated with the first housing 102 and the second data transceiver 134 associated with the second housing 104.

The first data transceiver 132 may include a first set of magnets positioned to attract a second set of magnets in the second data transceiver 134. Each data transceiver 132, 134 may have a bearing on either end to enable the magnets to cause the data transceivers 132, 134 to rotate, thereby causing the transceiver chips (and antennas) to face each other and remain within a particular distance (e.g., less than 10 mm) from each other, regardless of an orientation of the computing device 100. In this way, data cables may not be used to connect the components in the first housing 102 with the components in the second housing 104, thereby avoiding issues caused by repeatedly flexing data cables running between the first housing 102 and the second housing 104. In addition, by not running multiple data cables between the housings 102, 104, the hinges 106 may be made smaller and less obtrusive. Cabling to provide power may run between the first housing 102 and the second housing 104 to enable power from the battery 150 (and charger 148) to be distributed to the components in the first housing 102. The wireless data transceivers 132, 134 may be self-aligning and may wirelessly transmit at least 20 signals, including one or more universal serial bus (USB) 2.0 signals, one or more USB 3.0 signals, two or more lanes of DisplayPort(DP), one or more inter-integrated circuit (I2C) signals, one or more system management bus (SMB) signals, one or more audio (e.g., speaker, microphone, and the like) signals, one or more general purpose I/O (GPIO) signals, one or more sensor (e.g., accelerometer, magnetometer, and the like) signals, antenna (e.g., cellular, Wi-Fi, Bluetooth, and the like) signals, other types of signals, or any combination thereof.

Figure 2:
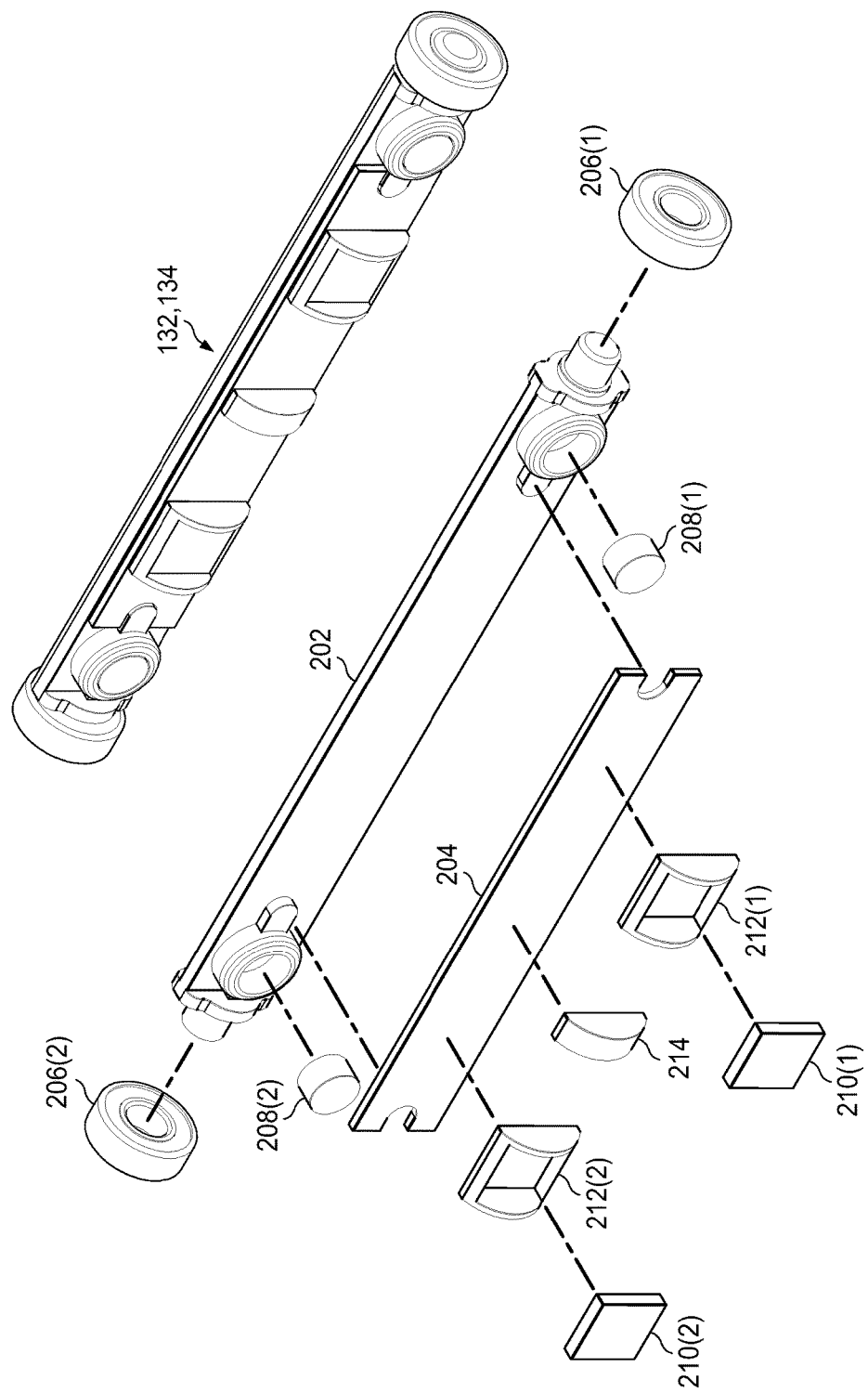
FIG. 2 is a block diagram of an architecture that includes components of a wireless data transceiver according to some embodiments.

FIG. 2 is a block diagram illustrating components of a data transceiver (e.g., the data transceivers 132, 134 of FIG. 1) according to some embodiments. For example, each of the wireless data transceivers 200 may include a frame 202 on to which a circuit board 202 is placed. Each frame 202 may include a cylindrical protrusion on either end over which a bearing may be placed. For example, bearings 206(1), 206(2) may be toroidal-shaped, e.g., with a hole in the middle, that enables the bearings 206(1), 206(2) to be placed on to the cylindrical protrusions of the frame 202. The bearings 206 may include ball bearings to enable each of the transceivers 132, 134 to rotate with very little friction.

The frame 202 may include two cylindrical cavities. A magnet 208(1) may be placed into a first one of the cylindrical cavities and a magnet 208(2) may be placed into a second one of the cylindrical cavities. The magnets 208 may be permanent magnets or electromagnets. The circuit board 202 may include semi-circular cutouts to accommodate the cylindrical cavities of the frame 202.

A first transceiver chip 210(1) and a second transceiver chip 210(2) may be physically and electrically attached to the circuit board 202. The transceiver chips 210(1), 210(2) may include the antennas 136, 138, respectively. As illustrated in FIG. 2, absorbers 212(1), 212(2) may be placed around transceivers 210(1), 210(2) to reflect, absorb, or direct the EHF frequencies that are not broadcast perpendicular to the circuit board 202. In some cases, an additional absorber 214 may be attached at approximately a mid-point of the circuit board 202. The absorber may be made from metal, rubber, plastic, another type of material, or any combination thereof.

In some cases, the data transceivers 132, 134 may be sealed inside an enclosure (e.g., plastic. metal, or other type of enclosure) to protect the components of the data transceiver 200. At least a portion of the enclosure may be clear (e.g., clear plastic or glass) to enable the transceiver chips 210 to have a line of sight to the other transceiver chips in the other data transceiver.

The thickness of the circuit board 202 may be between approximately 0.2 millimeters (mm) and approximately 0.6 mm thick and the thickness of the frame 202 may be between approximately 0.2 mm and approximately 0.6 mm thick. For example, in some cases the circuit board 202 may have a thickness of about 0.4 mm and the frame 202 may have a thickness of approximately 0.4 mm.

Figure 3:
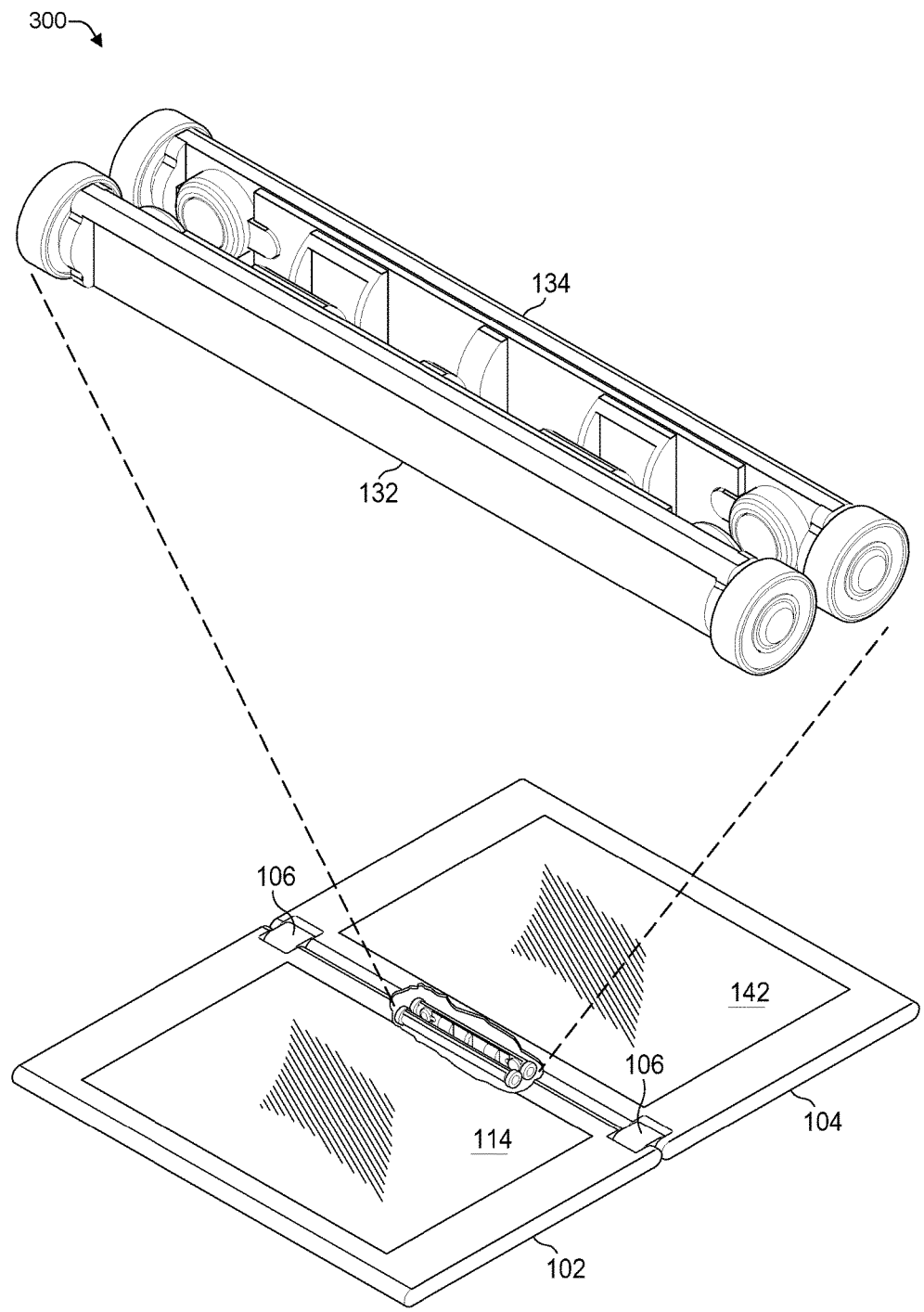
FIG. 3 is a block diagram of an architecture of a computing device in which two wireless data transceivers maintain a particular orientation with reference to each other according to some embodiments.

FIG. 3 is a block diagram of an architecture 300 of a computing device in which two self-aligning wireless data transceivers maintain a particular orientation with reference to each other (e.g., regardless of changes in orientation to the computing device 100) according to some embodiments. A first set of magnets (e.g., the magnets 208 of FIG. 2) of the first data transceiver 132 (associated with the first housing 102) may interact with a second set of magnets of the second data transceiver 134 (associated with the second housing 104). For example, the first set of magnets may be placed in the frame 202 with a particular polarity facing away from the circuit board 202. The second set of magnets may be placed in the frame of the second data transceiver 134 facing away with an opposite polarity compared to the first set of magnets. In this way, the first set of magnets of the first data transceiver 132 may be attracted to the second set of magnets of the second data transceiver 134. The attraction of the magnets in the first data transceiver 122 to the magnets in the second data transceiver 134 may cause the bearings of the data transceivers 132, 134 to rotate the data transceivers 132, 134 when an orientation of the computing device 100 changes. For example, the data transceivers 132, 134 may rotate in their respective bearings in such a way as to keep the transceiver chips in the first data transceiver 132 facing the transceiver chips in the second data transceiver 134. In this way, data can be wireless transmitted without interruption from one side (e.g., first housing 102) of the computing device 100 to the other side (e.g., the second housing 104) regardless of the orientation of the computing device 100 and regardless of changes made to the orientation of the computing device 100.

In some cases, the data transceivers 132, 134 may be sealed inside an enclosure (e.g., plastic, metal, or other type of enclosure) to protect the components of the data transceivers 132, 134. In some cases, at least a portion (e.g., a window) of the enclosure may be clear (e.g., clear plastic, glass, or another transparent material) to enable the transceiver chips of the first data transceiver 122 to remain in a line of sight to (and within a particular distance from) the transceiver chips of the second data transceiver 134, regardless of changes to the orientation of the computing device 100.

Figure 4:
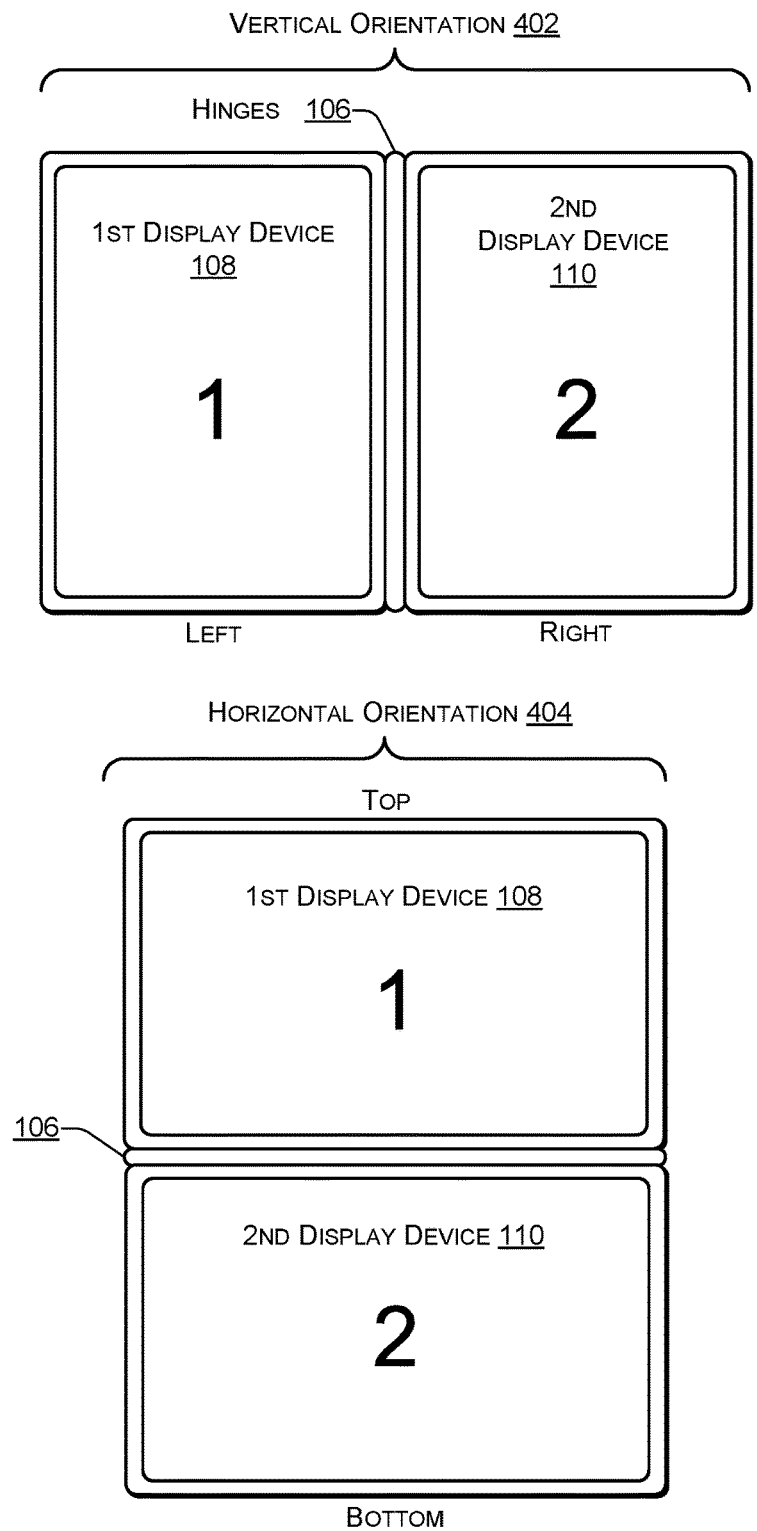
FIG. 4 is a block diagram illustrating different orientations of a dual-display device according to some embodiments.

FIG. 4 is a block diagram 400 illustrating different orientations of a dual-display device (e.g., the computing device 100 of FIG. 1) according to some embodiments. The computing device 100 may include at least two display devices, the first display device 108 and the second display device 110.

The computing device 100 may be placed in a vertical (e.g., portrait) orientation 202 or a horizontal (e.g., landscape) orientation 204. For example, in the vertical orientation 402, the first display device 108 may be on one side (e.g., the left side or the right side), the second display device 110 may be on another side (e.g., the right side or the left side), and the hinges 106 may join the first display device 108 to the second display device 110. In the vertical orientation 404, the first display device 108 may be located at the top (or the bottom) of the computing device 100, with the hinges 106 in the middle, and the second display device 110 at the bottom (or the top) of the computing device.

Figure 5:
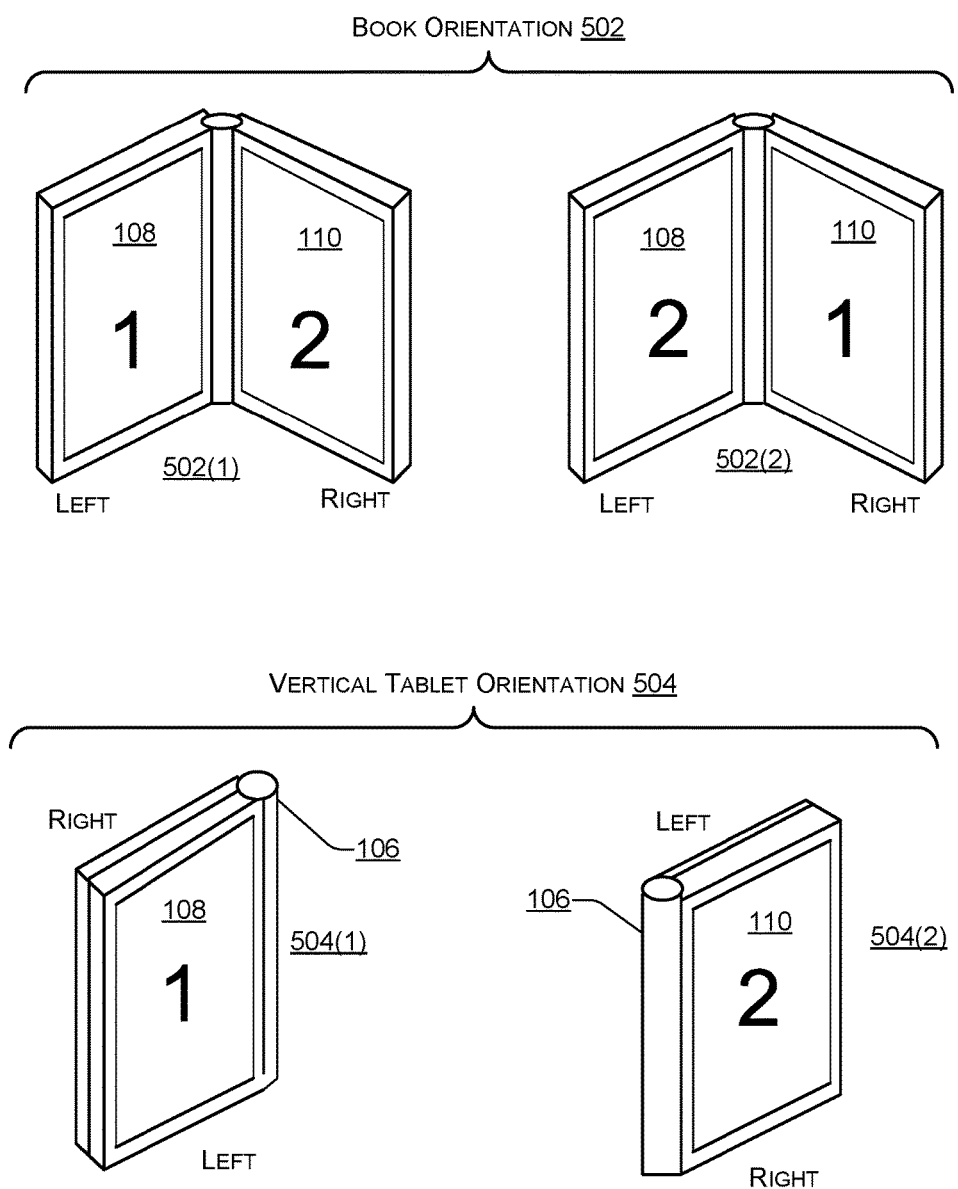
FIG. 5 is a block diagram illustrating vertical orientations of a dual-display device according to some embodiments.

FIG. 5 is a block diagram 500 illustrating vertical orientations of a dual-screen device (e.g., the computing device 100 of FIG. 1) according to some embodiments. Examples of the vertical orientation 402 may include a book orientation 502 or a vertical tablet orientation 504. For example, in a first book orientation 502(1), the first display device 108 may be on the left and the second display device 110 may be on the right. Alternately, in a second book orientation 502(2), the second display device 110 may be on the left and the first display device 108 may be on the right.

In the vertical tablet orientation 504, the first display device 108 may be on the left and the second display device 110 may be on the right. In a first vertical tablet orientation 504(1), the first display device 108 may be facing a user and the second display device 110 may be rotated approximately 360 degrees to face away from the user. In a second vertical tablet orientation 504(2), the second display device 110 may be facing the user while the first display device 108 may rotated approximately 360 degrees to face away from the user.

Figure 6:
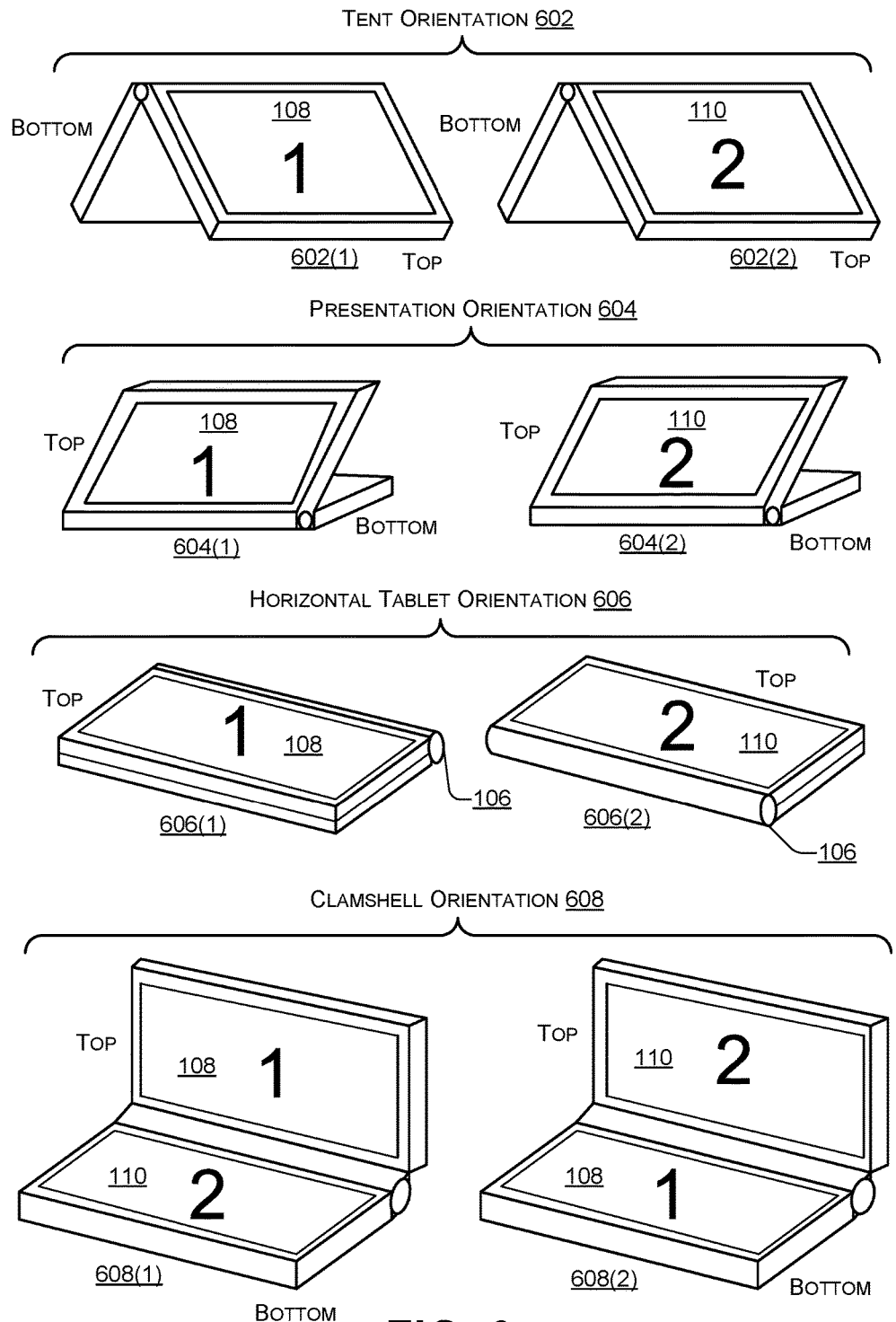
FIG. 6 is a block diagram illustrating horizontal orientations of a dual-display device according to some embodiments.

FIG. 6 illustrates horizontal orientations of a dual-screen device (e.g., the computing device 100 of FIG. 1) according to some embodiments. Examples of the horizontal orientation 404 may include a tent orientation 602, a presentation orientation 604, a horizontal tablet orientation 606, and a clamshell orientation 608.

In 602(1), the first display device 108 may be at the top facing the user while the second display device 110 may be at the bottom facing away from the user. In 602(2), the second display device 110 may be at the top facing the user and the first display device 108 may be at the bottom facing away from the user.

In 604(1), the first display device 108 may be at the top facing the user and the second display device 110 may be at the bottom facing down. In 604(2) the second display device 110 may be at the top facing the user and the first display device 108 may be at the bottom facing down.

In 606(1), the first display device 108 may be at the top facing the user and the second display device 110 may be at the bottom facing down (e.g., away from the user). In 606(2), the second display device 110 may be at the top facing the user and the first display device 108 may be at the bottom facing down (e.g., away from the user).

In 608(1), the first display device 108 may be at the top facing the user and the second display device 110 may be at the bottom facing the user (e.g., in a position where traditionally, a keyboard is located in a laptop). In 608(1), in some cases, a QWERTY-based keyboard may be displayed on the second display device 110 and used to receive keyboard input. In 608(2), the second display device 110 may be at the top facing the user and the first display device 108 may be at the bottom facing the user (e.g., in a position where traditionally, a keyboard is located in a laptop). In 608(2), in some cases, a QWERTY-based keyboard may be displayed on the first display device 108 and used to receive keyboard input.

Figure 7:
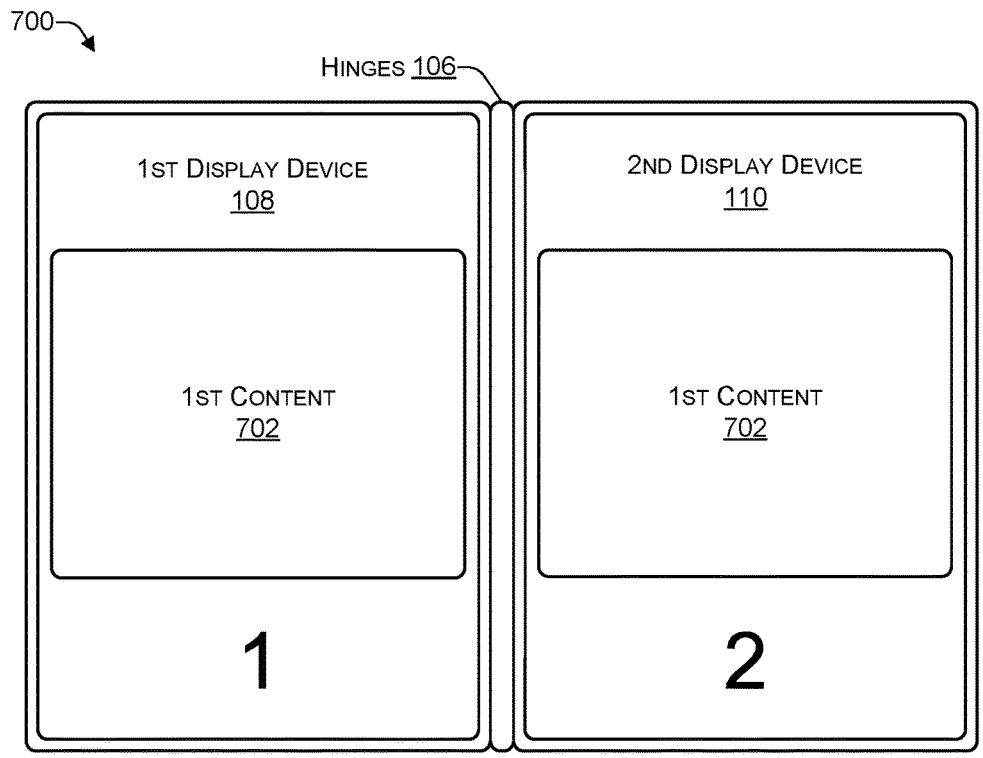
FIG. 7 is a block diagram illustrating different display modes of a dual-display device according to some embodiments.
Figure 7:
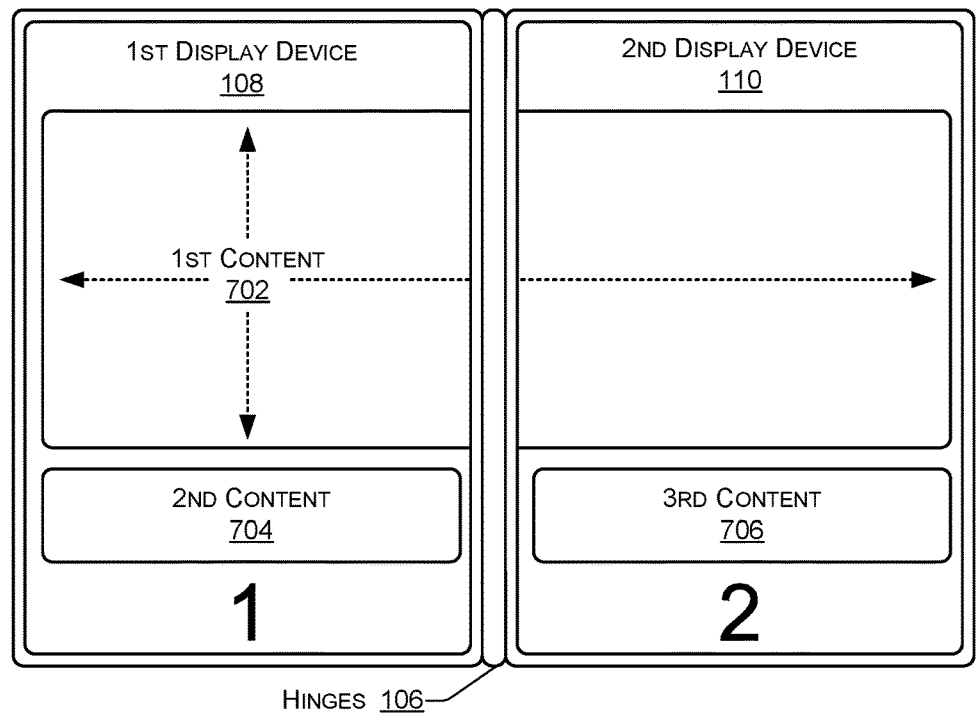

FIG. 7 is a block diagram illustrating different display modes of a dual-display device (e.g., the computing device 100 of FIG. 1) according to some embodiments. The top half of FIG. 7 illustrates when a display mode of an operating system of the dual-display device is set to display content in a clone mode or in a single display mode. In the clone mode, first content 702 may be displayed both on the first display device 108 and on the second display device 110. In the single display mode, the first content 702 may be displayed on either (but not both) of the first display device 108 or the second display device 110.

The bottom half of FIG. 7 illustrates when a display mode of an operating system of the dual-display device is set to display content in an extended display mode, in which the second display device 110 is setup as an extension of the first display device 108. In the extended display mode, some content, such as the first content 702, may be displayed across both the first display device 108 and the second display device 110. In some cases, additional content may be displayed on either the first display device 108 or the second display device 110. For example, second content 704 may be displayed on the first display device 108 and third content 706 may be displayed on the second display device 110.

Figure 8:
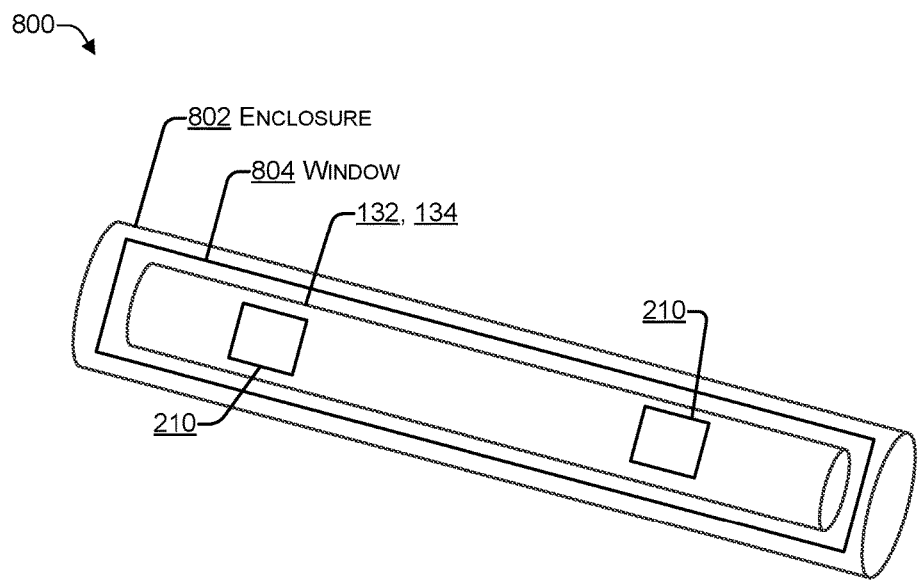
FIG. 8 is a block diagram of an architecture of a wireless data transceiver according to some embodiments.
Figure 8:
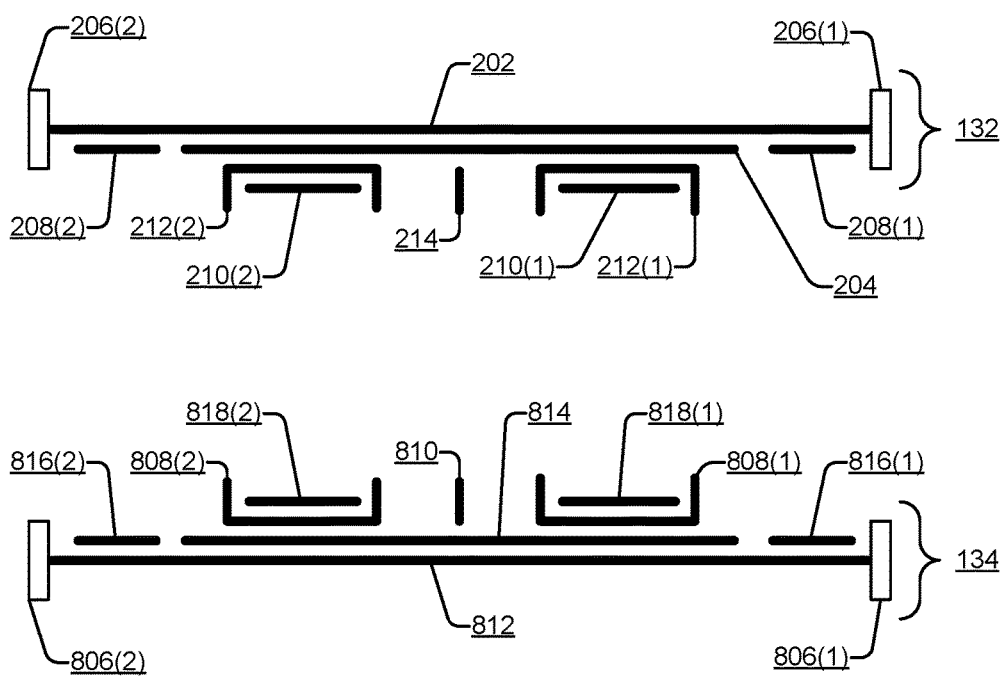

FIG. 8 is a block diagram of an architecture 800 of a wireless data transceiver according to some embodiments. The top illustration in FIG. 8 shows how each of the wireless data transceivers 132, 134 of FIG. 1 may be enclosed inside an enclosure 802. The enclosure 802 may be made out a material (e.g., plastic, glass, metal, ceramic, or the like) through which the EHF wireless frequency (e.g., between 50 GHz and 70 GHz) may be transmitted. In some cases, the enclosure 802 may include a window 804 to enable the antenna 136 of the transceiver 132 to remain in a line of sight of the antenna 138 of the transceiver 134, thereby providing an uninterrupted wireless exchange of data. By using frequencies EHF (e.g., between about 40 GHz and 80 GHz), radio frequency interference (RFI) and electromagnetic interference (EMI) may be reduced or eliminated.

The bottom illustration in FIG. 8 illustrates an overhead view of the data transceivers 132, 134 and provides an example of how the antennas of each of the power transceivers 132, 134 may remain facing each other after an orientation of the computing device 100 has changed. For ease of understanding, in FIG. 8, the enclosures are not shown, the distances between the components of the data transceivers 132, 134 are exaggerated, and a simplified view is shown.

The first data transceiver 132 may include the bearings 206(1), 206(2) on either end to enable the first data transceiver 132 to rotate very little friction. The first data transceiver 132 may include the frame 202 to which are attached the circuit board 204, the magnets 208(1), 208(2), the transceiver chips (with antennas) 210(1), 210(2), and the absorbers 212(1), 212(2), 214.

The second data transceiver 134 may include bearings 806(1), 806(2) on either end to enable the second data transceiver 134 to rotate. The second data transceiver 134 may include frame 812 to which are attached circuit board 814, magnets 816(1), 816(2), transceiver chips (with antennas) 818(1), 818(2), and absorbers 808(1), 808(2), 810.

The interaction (e.g., attraction) of the magnets 208 to the magnets 816 may cause at least one of the power transceivers 132, 134 to rotate within their respective bearings, thereby keeping the antennas of the transceiver chips 210, 818 facing (e.g., substantially parallel) each other, regardless of the orientation of the computing device 100. In this way, the wireless transmission of data from the first data transceiver 132 to the second data transceiver 134 and from the second data transceiver 134 to the first power transceiver 132 may remain uninterrupted when the orientation of the computing device 100 is changed from a first orientation to a second orientation.

Thus, the magnets 208, 816 and the bearings 206, 806 may orient the first data transceiver 132 such that the antennas of the transceiver chips 210 are facing (e.g., approximately parallel) to the antennas of the transceiver chips 818 of the second data transceiver 134. For example, the transceiver chips 210 may not be exactly parallel to the transceiver chips 818, with slight deviations in angle causing a loss in efficiency that is within a threshold range (e.g., no more than 5% loss of efficiency). The distance between the transceiver chips 210, 818 may be between approximately 5 millimeters (mm) and approximately 15 mm. For example, in some cases, the distance between the antennas of the transceiver chips 210, 818 may be approximately 7 mm.

Figure 9:
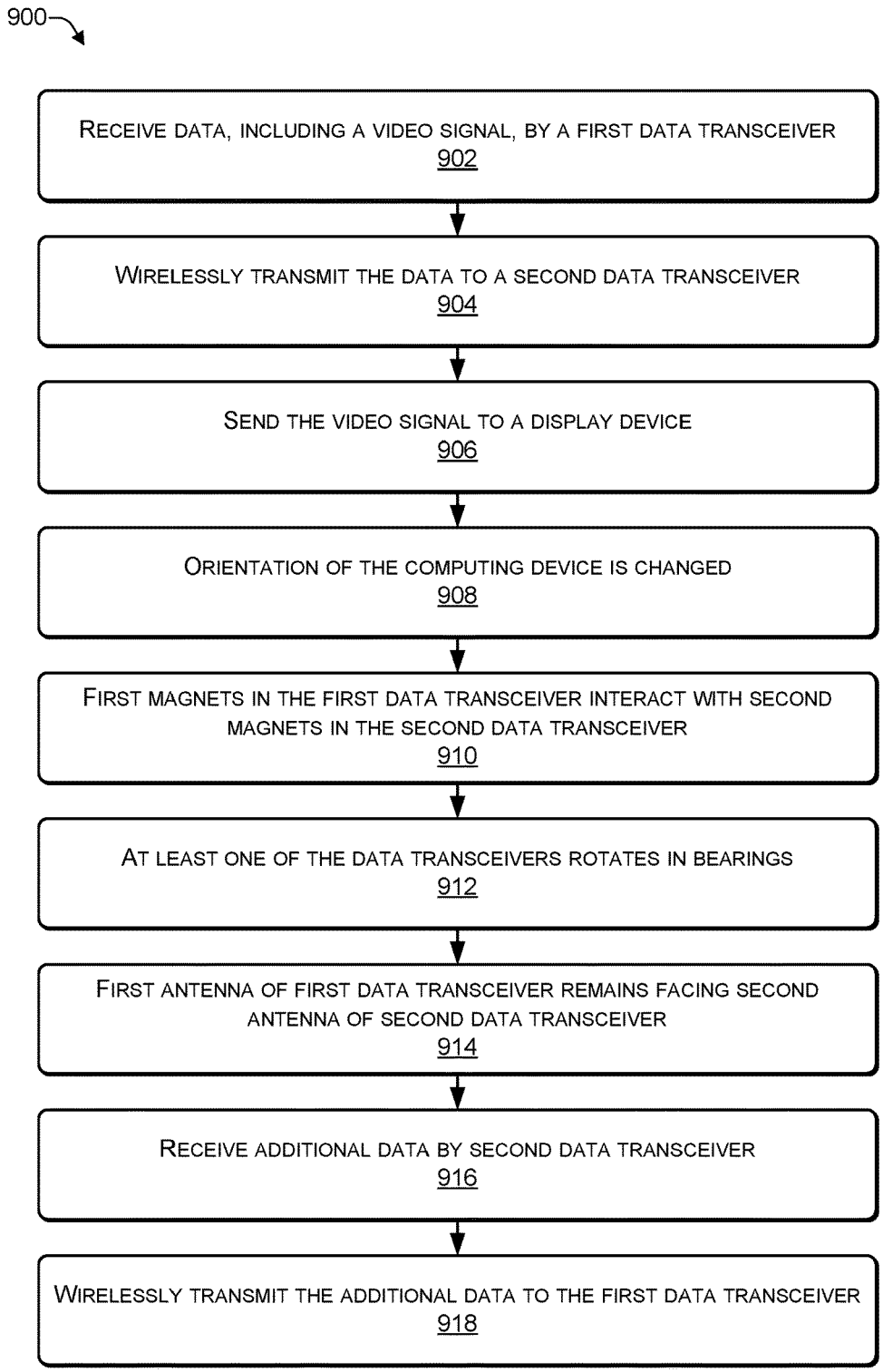
FIG. 9 is a flowchart of a process that includes positioning a first data transceiver relative to a second data transceiver according to some embodiments.

In the flow diagram of FIG. 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900 is described with reference to FIGS. 1, 2, 3, 4, 5, 6, 7, 8 as described above, although other models, frameworks, systems and environments may be used to implement this process.

FIG. 9 is a flowchart of a process 900 that includes positioning a first antenna of a first data transceiver relative to a second antenna of a second data transceiver according to some embodiments. The process 900 may be performed by one or more components of the computing device 100 of FIG. 1.

At 902, data that includes a video signal (e.g., DP signal) may be received by a first data transceiver. At 904, the first data transceiver may wireless transmit the data from the first data transceiver to a second data transceiver. At 906, the second data transceiver may send the video signal to a display device. For example, in FIG. 1, the first data transceiver 134 may receive data, such as the DP output 126 and second I/O signals 122. The second data transceiver 134 may transmit the data to the first data transceiver 132. The first data transceiver 132 may extract the DP signal 142 from the data and send the DP signal 142 to the second display device 110.

At 908, a change in an orientation of the computing device may be detected. At 910, a first set of magnets in the first data transceiver may interact with a second set of magnets in the second data transceiver. At 912, at least one of the first data transceiver or the second data transceiver may rotate in their respective bearings. At 914, a first antenna of the first data transceiver may remain facing (e.g., substantially parallel or in a line of sight of) a second antenna of the second data transceiver. For example, in FIG. 4, a user may change the computing device 100 from one of the vertical orientations 402, 502, 504 to one of the horizontal orientations 404, 602, 604, 606, 608 or from one of the horizontal orientations 404, 602, 604, 606, 608 to one of the vertical orientations 402, 502, 504. In FIG. 8, the magnets 208 of the first data transceiver 132 may interact with the magnets of the second data transceiver 134. For example, the magnets 208 of the first data transceiver may face the second data transceiver 134 with a first polarity. The magnets 816 of the second data transceiver 134 may face the magnets 208 with an opposite polarity, resulting in an attraction between the magnets 208 of the first data transceiver 132 and the magnets of the second data transceiver 134. This magnetic attraction may cause at least one of the data transceivers 132, 134 to rotate within the bearings 206, 806, resulting in the antenna of the transceiver chips 210 facing (e.g., continuing to be in a line of sight of) the antenna of the transceiver chips 818.

At 916, additional data may be received by the second data transceiver. At 918, the second data transceiver may wirelessly transmit the additional data to the first data transceiver. For example, in FIG. 1, the second transceiver 134 may receive additional data from one or more of the second ports 140 (e.g., USB, audio, or the like), one or more of the additional components 144 (e.g., an input device such as a keyboard or a trackpad, or another component), or any combination thereof. The second transceiver 134 may wirelessly transmit the additional data (e.g., using EHF frequencies) to the first transceiver 132. The first transceiver 132 may extract individual signals (e.g., USB 2.0, USB 3.0, audio, input device data, and the like) from the additional data and route them to the appropriate components in the first housing 102. For example, if additional data includes a request to access the memory 116, the memory 116 may be accessed and the requested data sent from the memory 116 to the first transceiver 132, wirelessly transmitted to the second transceiver 134, and routed to the component in the second housing 104 that sent the memory request. As another example, data received from an input device (e.g., keyboard, trackball, etc.) may be sent to the CPU 112 and the CPU 112 may take appropriate actions.

Thus, a computing device may include a first data transceiver and a second data transceiver. The first data transceiver may receive data from one or more components in a first housing and wirelessly transmit the data to a second data transceiver at a frequency of between about 50 GHz and 70 GHz (e.g., 60 GHz). The second data transceiver may extract signals from the data and distribute the signals to components in the second housing. For example, the data may include a video signal (e.g., DP output) that is sent to a display device in the second housing. The first data transceiver may include a first set of magnets positioned to attract a second set of magnets in the second data transceiver. Each data transceiver may include a bearing on either end that enables each data transceiver to rotate, such that a first antenna of the first data transceiver remains facing (e.g., in a line of sight of) a second antenna of the second data transceiver, regardless of changes to an orientation of the computing device.

Figure 10:
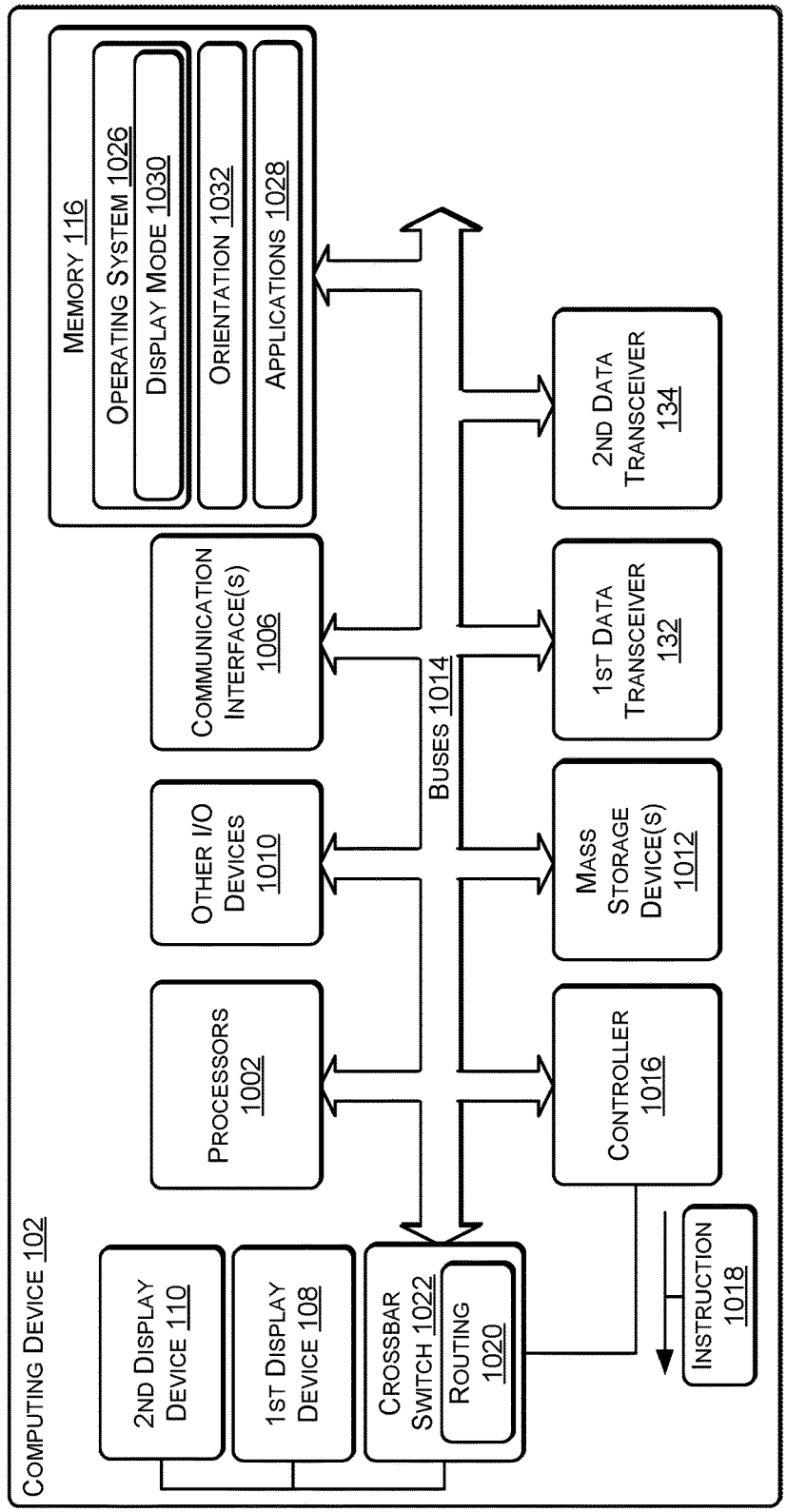
FIG. 10 illustrates an example configuration of a computing device that can be used to implement the systems and techniques described herein.

FIG. 10 illustrates an example configuration of the computing device 100 of FIG. 1 that can be used to implement the systems and techniques described herein. The computing device 100 may include one or more processors 1002 (e.g., the CPU 112 and the GPU 114 of FIG. 1), the memory 116, communication interfaces 1006 (e.g., the I/O ports 120, 140), the display devices 108, 110, other input/output (I/O) devices 1010 (e.g., keyboard, trackball, and the like), and one or more mass storage devices 1012, configured to communicate with each other, such as via one or more system buses 1014 or other suitable connection. While a single bus is illustrated for ease of understanding, it should be understood that the system buses 1014 may include multiple buses, such as memory device buses, storage device buses, data buses, video signal buses, and the like.

The processors 1002 are one or more hardware devices that may include a single processing unit or a number of processing units, all of which may include single or multiple computing units or multiple cores. The processors 1002 may include the GPU 114 integrated into the CPU 112 or the GPU 114 may be a separate processor device from the CPU 112. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 116, mass storage devices 1012, or other computer-readable media.

Memory 116 and mass storage devices 1012 are examples of non-transitory computer media (e.g., memory storage devices) for storing instructions that can be executed by the processors 1002 to perform the various functions described herein. For example, memory 116 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1012 may be collectively referred to as memory or computer storage media herein, and may be a non-transitory media capable of storing computer-readable, processor-executable program instructions as computer program code that can be executed by the processor 1002 as a particular machine configured for carrying out the operations and functions described in the implementations herein.

The computing device 100 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 108, 110 may be connected to each other using one or more hinges (e.g., the hinges 106 of FIG. 1) that enable each display device to be placed at an angle relative to the other display device. For example, the display devices 108, 110 may be used for displaying information and images to users. Other I/O devices 1010 may be devices that receive various inputs from a user and provide various outputs to the user, and may include a keyboard, a remote controller, a mouse, a printer, audio input/output devices, and so forth.

The computer storage media, such as memory 116 and mass storage devices 1012, may be used to store software and data. For example, the computer storage media may be used to store an operating system 1026 and software applications 1028. The operating system 1026 may be set to a particular display mode 1030. For example, the operating system 1026 may have a default display mode and a user may set the display mode 1030 to something different than the default display mode. The display mode 1030 may be one of (1) an extended display mode (e.g., see bottom of FIG. 7), (2) a single display mode (e.g., see top of FIG. 7), or (3) a clone mode (e.g., see top of FIG. 7). The computer storage media may store an orientation 1032 (e.g., vertical orientation, horizontal orientation, or the like), and one or more software applications 1028. The software applications 1028 display the content 702, 704, 706 of FIG. 7 and may include a word processing application, a spreadsheet application, and the like.

Based on the display mode 1030 and the orientation 1032, the controller 1016 may select a routing 1020 from one of the multiple routings (e.g., normal, swap, eDP only, or DP only) associated with a crossbar switch 1022. The controller 1016 may modify the content 1022 to create modified content. The modified content may be routed by the crossbar switch 1022 to one or both of the display devices 108, 110 according to the selected routing 1020.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A computing device comprising:
 a first housing comprising:
  a first display device to receive a first video signal;
  a first data transceiver to:
   wirelessly transmit first data to a second data transceiver, wherein the first data includes a second video signal; and
   wirelessly receive second data transmitted by the second data transceiver;
 a second housing comprising:
  the second data transceiver to:
   wirelessly transmit the second data to the first data transceiver; and
   wirelessly receive the first data transmitted by the first data transceiver; and
  a second display device to receive the second video data included in the first data; and
 one or more hinges to couple the first housing to the second housing;
 wherein each of the first data transceiver and the second data transceiver comprise:
  a frame comprising:
   at least one magnet;
   a circuit board comprising at least one transceiver chip; and
   a first cylindrical protrusion over which a first toroidal-shaped bearing is placed; and
   a second cylindrical protrusion over which a second toroidal-shaped bearing is placed; and
  wherein the first and second toroidal-shaped bearings enable the first data transceiver and the second data transceiver to rotate.

2. The computing device of claim 1, wherein wirelessly transmitting the first data to the second data transceiver comprises:
 wirelessly transmitting the data from the first data transceiver to the second data transceiver at a frequency of between about 50 gigahertz (GHz) and about 70 GHz.

3. The computing device of claim 1, wherein the first data transceiver and the second data transceiver each further comprise:
 an antenna; and
 at least one absorber.

4. The computing device of claim 1, wherein:
 a first set of magnets is located in the first data transceiver and face outward with a first polarity; and
 a second set of magnets is located in the second data transceiver and face outward with a reverse polarity relative to the first polarity, the reverse polarity causing the first set of magnets to have an attraction to the second set of magnets.

5. The computing device of claim 1, wherein:
 the first video signal comprises at least two lanes of an embedded DisplayPort (eDP) output of a graphics processing unit (GPU); and
 the second video signal comprises at least two lanes of DisplayPort (DP) output of the GPU.

6. The computing device of claim 1, wherein the first data comprises at least one of:
 a universal serial bus (USB) 2.0 compliant signal;
 a USB 3.0 compliant signal;
 an inter-integrated circuit (I2C) compliant signal;
 a system management bus (SMB) compliant signal;
 an audio signal;
 a general-purpose I/O (GPIO) compliant signal;
 a sensor signal received from a sensor; or
 a wireless signal from an antenna.

7. The computing device of claim 1, wherein:
 the first data transceiver is enclosed in a first enclosure having a first clear window; and
 the second data transceiver is enclosed in a second enclosure having a second clear window to enable a first antenna associated with the first data transceiver to be in a line of sight and within about 10 millimeters (mm) of a second antenna associated with the second data transceiver.

8. A method comprising:
 receiving, by a first data transceiver, data comprising a video signal, the first data transceiver located in a first housing of a computing device, wherein the first housing includes a first display device;
 wirelessly transmitting the data from the first data transceiver to a second data transceiver, the second data transceiver located in a second housing that is attached to the first housing by one or more hinges; and
 sending the video signal included in the data from the second data transceiver to a second display device located in the second housing:,
 wherein:
 the first data transceiver comprises:

a first frame;
a first circuit board comprising a first antenna;
a first set of magnets facing outward from the first frame with a first polarity; and
a first pair of bearings mounted on either end of the first frame that enable the first circuit board to rotate; and
the second data transceiver comprises:
a second frame;
a second circuit board comprising a second antenna;
a second set of magnets facing outward from the second frame with a reverse polarity relative to the first polarity causing a magnetic attraction between the first set of magnets and the second set of magnets; and
a second pair of bearings mounted on either end of the second frame that enable the second circuit board to rotate.

9. The method of claim 8, wherein wirelessly transmitting the data from the first data transceiver to the second data transceiver comprises:
wirelessly transmitting the data from the first data transceiver to the second data transceiver at a frequency of between about 50 gigahertz (GHz) and about 70 GHz.

10. The method of claim 8, wherein the data further comprises at least one of:
a universal serial bus (USB) 2.0 compliant signal;
a USB 3.0 compliant signal;
an inter-integrated circuit (I2C) compliant signal;
a system management bus (SMB) compliant signal;
an audio signal;
a general-purpose I/O (GPIO) compliant signal;
a sensor signal received from a sensor; or
a wireless signal from an antenna.

11. The method of claim 8, wherein:
the first data transceiver is enclosed in a first enclosure having a first clear window; and
the second data transceiver is enclosed in a second enclosure having a second clear window to enable the first antenna to remain in a line of sight and within about 10 millimeters (mm) of the second antenna.

12. The method of claim 11, wherein the magnetic attraction between the first set of magnets and the second set of magnets causes:
the first data transceiver to rotate within the first pair of bearings;
the second data transceiver to rotate within the second pair of bearings; and
the first antenna faces the second antenna regardless of an orientation of the computing device.

13. The method of claim 11, further comprising:
receiving, by the second data transceiver, additional data from a component of the computing device that is located in the second housing; and
wirelessly transmitting the additional data from the second data transceiver to the first data transceiver substantially at the same time that the first data transceiver is wirelessly transmitting the data from the first data transceiver to a second data transceiver.

14. A computing device comprising:
a first housing comprising:
a first data transceiver to wirelessly communicate data, wherein the first data transceiver comprises:
a first frame;
a first circuit board comprising a first antenna;
a first set of magnets facing outward from the first frame with a first polarity; and
a first pair of bearings mounted on either end of the first frame that enable the first circuit board to rotate; and
a second housing comprising:
a second data transceiver to wirelessly communicate the data to and from the first data transceiver, wherein the second data transceiver comprises:
a second frame;
a second circuit board comprising a second antenna;
a second set of magnets facing outward from the second frame with a reverse polarity relative to the first polarity causing a magnetic attraction between the first set of magnets and the second set of magnets; and
a second pair of bearings mounted on either end of the second frame that enable the second circuit board to rotate; and
one or more hinges to couple the first housing to the second housing.

15. The computing device of claim 14, wherein the data received by the second data transceiver from the first data transceiver comprises at least two lanes of a DisplayPort (DP) signal.

16. The computing device of claim 15, wherein:
the first housing further comprises:
a computer motherboard that includes a graphics processing unit (GPU); and
a first display device connected to an embedded DisplayPort (eDP) output of the GPU; and
the second housing further comprises:
a second display device to receive the at least two lanes of the DP signal.

17. The computing device of claim 14, wherein the data comprises at least one of:
a universal serial bus (USB) 2.0 compliant signal;
a USB 3.0 compliant signal;
an inter-integrated circuit (I2C) compliant signal;
a system management bus (SMB) compliant signal;
an audio signal;
a general-purpose I/O (GPIO) compliant signal;
a sensor signal received from a sensor; or
a wireless signal from an antenna, the wireless signal comprising one of a WiFi signal, a Bluetooth signal, or a cellular signal.

18. The computing device of claim 14, wherein the attraction between the first set of magnets and the second set of magnets causes:
the first data transceiver to rotate within the first pair of bearings;
the second data transceiver to rotate within the second pair of bearings; and
the first antenna to remain facing the second antenna regardless of an orientation of the computing device.

19. The computing device of claim 14, wherein the second data transceiver wirelessly communicates the data to and from the first data transceiver at a frequency of between about 50 gigahertz (GHz) and about 70 GHz.

20. The computing device of claim 14, further comprising:
a first enclosure in which the first data transceiver is enclosed, the first enclosure having a first clear window; and
a second enclosure in which the second data transceiver is enclosed, the second enclosure having a second clear window to enable the first antenna of the first data transceiver to be in a line of sight of and within 10 mm from the second antenna of the second data transceiver.

* * * * *